United States Patent
Apfel et al.

[15] 3,679,291
[45] July 25, 1972

[54] FILTER WITH NEUTRAL TRANSMITTING MULTILAYER COATING HAVING ASYMMETRIC REFLECTANCE

[72] Inventors: Joseph H. Apfel, Santa Rosa; Robert M. Gelber, Rohnert Park, both of Calif.

[73] Assignee: Optical Coating Laboratory, Inc., Santa Rosa, Calif.

[22] Filed: April 21, 1970

[21] Appl. No.: 30,495

[52] U.S. Cl. .................... 350/164, 117/33.3, 350/314
[51] Int. Cl. .................................................. G02b 1/10
[58] Field of Search .................... 350/163–166, 1, 350/314; 117/33.3

[56] References Cited

UNITED STATES PATENTS 2,366,687   1/1945   Osterberg .................... 350/164

OTHER PUBLICATIONS

Kard, P. G., " Theory of Multilayer Asymmetric Reflectors," Optics and Spectroscopy, Vol. 10, No. 3, March, 1961, QC350, Q64, pp. 193– 196.

Kard, P. G., " Principles of the Theory of the Synthesis of Coated Absorbing Layers," Optics & Spectroscopy, Vol. 9, No. 3, September, 1960, QC350, Q64, pp. 200– 204.

Kard, P. G., " Theory of Increasing the Transparency of Metallic Coatings," Vol. 9, No. 2, August, 1960, QC350, Q64, pp. 129– 131.

*Primary Examiner*—David Schonberg
*Assistant Examiner*—Toby H. Kusmer
*Attorney*—Flehr, Hohback, Test, Albritton & Herbert

[57] ABSTRACT

Filter with neutral transmitting multilayer coating having asymmetric reflectance with strong color on one side. Certain embodiments have low reflectance on the other side over a broad spectral region which covers at least a visible portion of the electromagnetic spectrum. Certain of the filters have a single metal layer with at least one dielectric layer, whereas others of the filters have a pair of metal or absorbing layers, each of which is paired with one or more dielectric layers.

18 Claims, 24 Drawing Figures

INVENTORS
Joseph H. Apfel
Robert M. Gelber

INVENTOR.
Joseph H. Apfel
Robert M. Gelber
BY Flehr, Hohbach, Test,
Albritton & Herbert
Attorneys

FILTER WITH NEUTRAL TRANSMITTING MULTILAYER COATING HAVING ASYMMETRIC REFLECTANCE

BACKGROUND OF THE INVENTION

Filters with multilayer coatings which are neutral in transmission and have an asymmetric reflectance have heretofore been produced. However, they often have not had the strong color reflection which has been desired. Also, when making a filter which transmits less than approximately 60 percent, this results in an absorbing layer which is thick enough so that the reflectance on the boundary of the absorbing layer approaches an appreciable fraction of the reflectance of the opaque absorbing material. It, therefore, becomes impossible to achieve a low reflectance over a broad spectral region without comprising certain other features of the filter. There, therefore, is a need for a new and improved filter which overcomes these disadvantages as well as having other desirable features.

SUMMARY OF THE INVENTION AND OBJECTS

The filter with a neutral transmitting multilayer coating having asymmetric reflectance consists of at least one absorbing layer formed of a metal and one or more dielectric layers. In certain of the embodiments, a pair of metal layers are provided with a dielectric layer for each of the metal layers. At least one of the surfaces has a strong color. The filter has a neutral transmission with transmission levels ranging from 0 to 60 percent. One side has a low reflectance over a broad spectral region covering at least the visible portion of the electromagnetic spectrum.

In general, it is an object of the present invention to provide a filter with a neutral transmitting multilayer coating with asymmetric reflectance with one side of the filter having a strong color.

Another object of the invention is to provide a filter of the above character in which color reflections of different colors may be obtained.

Another object of the invention is to provide a filter of the above character which has a low reflectance on one side over a broad spectral region covering at least a visible portion of the electromagnetic spectrum.

Another object of the invention is to provide a filter of the above character which has a neutral transmission over a broad spectral region with transmission levels ranging from 0 to 60 percent.

Another object of the invention is to provide a filter of the above character which has moderate to high, although not necessarily uniform, reflectance from the other side of the filter.

Another object of the invention is to provide a filter of the above character which can be utilized in locations where there is strong illumination.

Another object of the invention is to provide a filter of the above character which can be utilized architecturally.

Additional objects and features of the invention will appear from the following description in which the preferred embodiments are set forth in detail in conjunction with the accompanying drawing.

DESCRIPTION OF THE PREFERRED EMBODIMENT

Figure 1:
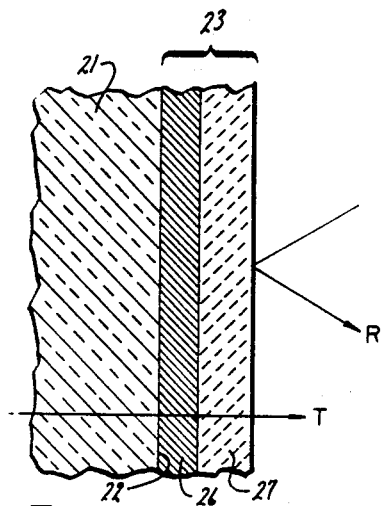
FIG. 1 is a cross-sectional view of a filter incorporating the present invention.

The filter incorporating the present invention and shown in FIG. 1 consists of a substrate 21 which is substantially transparent. The substrate can be in the form of any suitable material such as glass. In any event, the substrate 21 should not be opaque. The substrate 21 is provided with a surface 22 on which there is disposed a multilayer coating 23. The multilayer coating 23 is comprised of at least one metal-dielectric combination. Each metal-dielectric combination consists of a metal layer 26 which is in contact with the surface 22 and at least one dielectric layer 27 which is disposed on the metal layer 26. The dielectric layer 27 is selected for an index of refraction and a thickness so as to achieve an overall reflectance of zero at the design wavelength for the filter or at any frequency in the wavelength region of interest. In other words, the dielectric layers are utilized as an anti-reflection coating for the metal layer 26. Thus, the thickness and the index of refraction of the dielectric layer is dictated by the thickness and other properties of the metallic layer or film 26 so that for each metallic film there is a specific dielectric film which should be utilized to achieve zero or near zero value of reflectance at the design wavelength. The overall result will be of low reflection over the wavelength region of interest. Such a filter normally is neutral by transmission. In other words, it is achromatic.

Thus, it can be seen that metal dielectric layers may be utilized in the present filter for the purpose of achromatizing one or more of the spectral properties of that filter over a given wavelength region. As hereinafter explained, the layers can be designed to produce a sharp change in those properties at one or both edges of the achromatized region.

The function of the metal dielectric layers to obtain a neutral transmission and a colored reflection may be understood by considering the change in the reflections and phase angle as a function of the thickness of the materials utilized for the metal layer and the dielectric layer or layers. It can be appreciated that as the thickness of the metal layer increases, the amplitude of reflectance and the reflected phase angle change. After the metal layer has been deposited, the dielectric layer is deposited to cause a change in amplitude of reflectance and the phase angle. In general, the thickness of the metal layer and the dielectric layer are chosen so that at the end of the metal-dielectric combination, the amplitude and phase angle are the same as that of the substrate before the multilayer coating was deposited thereon.

When the materials for the filter are properly chosen, the metal-dielectric combination tends to remove any dispersion that exists in the substructure so that the completed filter exhibits achromatization in transmission. This achromatization improves as more metal-dielectric combinations are utilized in the filter. The reflectances and the transmission obtained from particular filters designed in accordance with the construction shown in FIG. 1 are shown in FIGS. 2 through 5.

Figure 2:
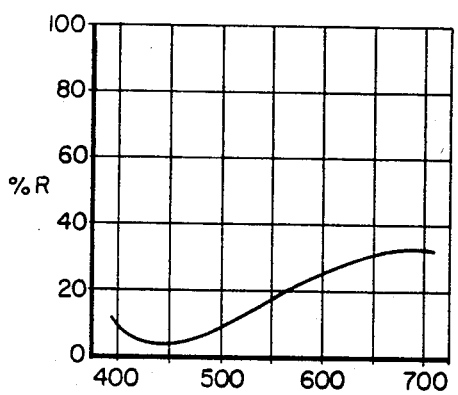
FIGS. 2 and 3 are graphs showing the reflectance and transmittance for a specific filter constructed in accordance with FIG. 1.
Figure 3:
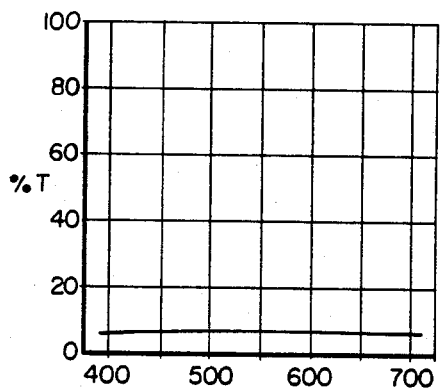

For the filter which is represented by the graphs shown in FIGS. 2 and 3, the metal layer was a thin layer of Inconel having a thickness of 67.5 millimicrons upon which there was deposited a layer of titanium dioxide having a quarter wave optical thickness of 225 millimicrons. Such a filter gave a reflection which was metallic gold in appearance from the front surface and a silver appearance from the back surface looking through the substrate 21. The transmission was relatively low i.e., in the order of 6 percent.

Figure 4:
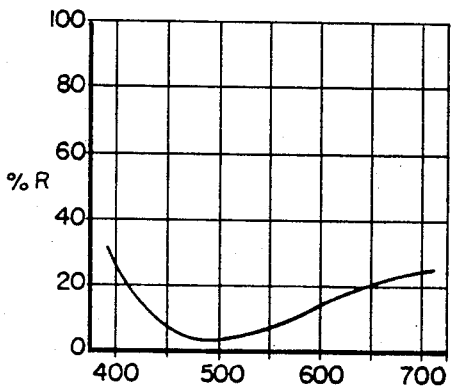
FIGS. 4 and 5 are also graphs showing reflectance and transmittance of another specific filter constructed in accordance with FIG. 1.
Figure 5:
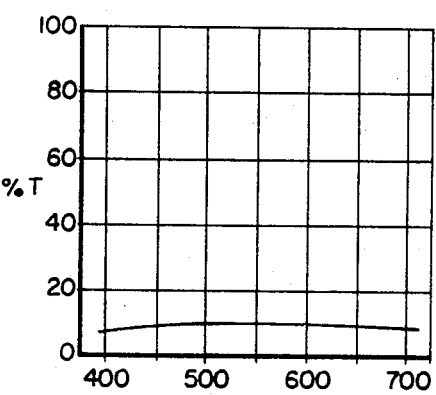

For the graphs such as shown in FIGS. 4 and 5, the filter was formed of a metal layer of Inconel having a thickness of 67.5 millimicrons overcoated with a dielectric layer of titanium dioxide having a quarter wave optical thickness of 250 millimicrons. This filter also had low transmission as can be seen from FIG. 5. The filter had a metallic magenta appearance from the front side and a silver appearance from the back side looking through substrate 21.

As can be appreciated, the metal layer 26 is very thin so that it is semi-transparent. It also should be appreciated that if it is desired to obtain additional transmission through the filter, this can be readily obtained by reducing the thickness of the metal layer without a substantial loss in the reflection of the desired color. This may be desirable in certain applications as, for example, in sunglasses where 20 to 25 per cent transmission is desirable.

Figure 6:
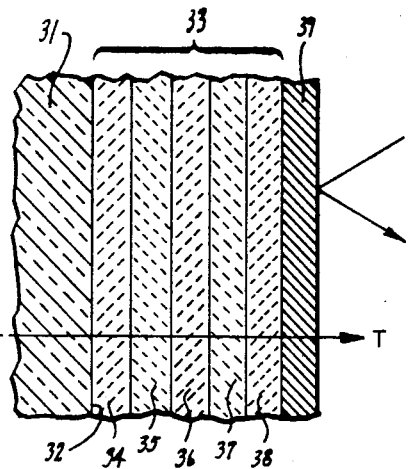
FIG. 6 is a cross-sectional view of another filter incorporating the present invention.

In FIG. 6 there is disclosed another embodiment of a filter incorporating the present invention. It consists of a transparent or substantially transparent substrate 31 having a surface 32 and upon which there is disposed a multilayer coating 33 consisting of a plurality of dielectric layers and a single metal layer. Thus, in the embodiments shown in FIG. 6 there are provided five dielectric layers 34 through 38 and a single metal layer 39. The dielectric layers are utilized to coat the substrate to achieve a rather high reflectance prior to the application of the metal layer 39. In general, it is desirable to obtain a reflectance which is comparable to that of the semi-transparent metal film 39 but which is made up of nonabsorbing materials to form a dielectric stack. The metal film is deposited on the dielectric stack to provide a filter which has a reflectance which varies rapidly with wavelength in the visible region to give a colored appearance. Again, in this embodiment of the filter, transmission is incidental to the design concept of achieving a strong color.

It has been found that the reflected color which is obtained by a filter of the type shown in FIG. 6 is greater that that which can be obtained with a design such as that shown in FIG. 1.

Figure 7:
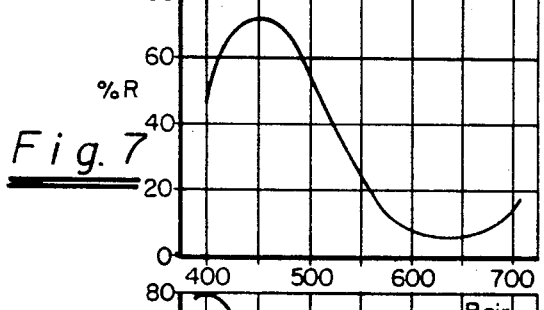
FIGS. 7 and 8 are graphs showing the reflectance and transmittance of a particular filter constructed in accordance with FIG. 6.
Figure 8:
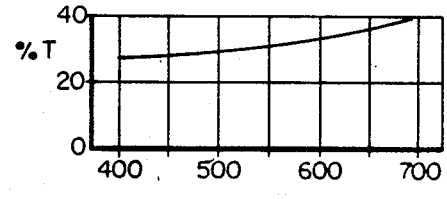

To obtain the results which are shown in FIGS. 7 and 8, a filter was constructed in accordance with FIG. 6 which had 5 dielectric layers formed of two different materials, titanium dioxide (TiO$_2$) and silicon dioxide (SiO$_2$), arranged in an A B A B A C sequence with A representing titanium dioxide, B representing silicon dioxide and C representing the metal. All of the layers had a quarter wave optical thickness. The design for the quarter wave stack was centered at 836 nanometers. The final film was formed of Inconel having a thickness of 20 nanometers. From the graphs, it can be seen that there is a strong reflection at 436 nanometers in the blue with the reflectance dropping off to a minimum at 600 nanometers and rising slightly in the red to give a generally blue appearance for the filter from the air side. As can be seen, the reflection at 600 nanometers is very near to that of uncoated glass. The metal layer 39 has the effect of reducing the reflection in the red portion of the visible spectrum (600 to 700 nanometers). The Inconel film itself has a high reflectance in the blue region which is essentially unaltered by the existence of the dielectric stack in that region. Thus, the strong blue reflection of 60 to 70 percent which is obtained from the filter is basically independent of the existence of the dielectric stack. On the other hand, the dielectric stack does have a considerable effect in the red region and the result is a very low reflectance as viewed from the metal side of the filter.

In general, it was found that the filter has a similar appearance from the substrate or glass side and from the metal side. This is true because the dielectric stack has a relatively small effect upon the metal in the blue region.

It can be seen that the transmission curve for such a filter is reasonably neutral having a value of around 30 to 33 percent extending from 29 percent in the blue to approximately 41 in the extreme red. Although the filter does have a slight rose tint, it still can be considered to be a neutral transmitting filter.

Figure 9:
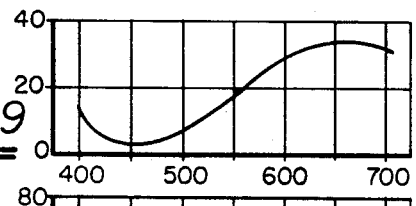
FIGS. 9 and 10 are graphs showing the reflectance and transmittance of another particular filter constructed in accordance with FIG. 6.
Figure 10:
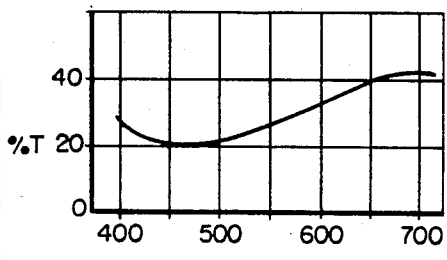

The curves which are shown in FIGS. 9 and 10 were obtained from a filter which was constructed essentially in the same manner as shown in FIG. 6 with the exception that the layer 38 of titanium dioxide is eliminated. The other layers all have the same thicknesses and are formed of the same materials. As can be seen, such a filter has a reflection which is low in the blue region and moderately high in the red and orange resulting in a yellow appearance. As also can be seen, the transmission is also different extending from the minimum of 20 percent in the blue to a maximum of 44 percent in the red and thus departs somewhat from being truly neutral in transmission. In general, is considered that the filter is out of the range of neutrality when the maximum transmission is more than twice the minimum transmission.

Figure 11:
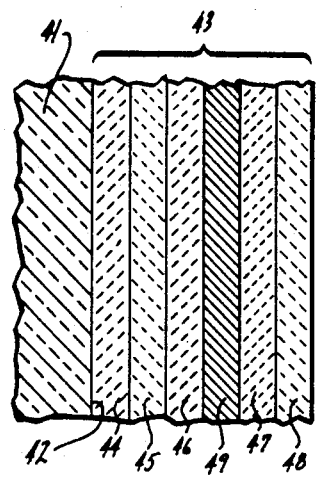
FIG. 11 is a cross-sectional view of still another embodiment of a filter incorporating the present invention.

In FIG. 11 there is shown another filter incorporating the present invention which utilizes an induced transmission concept. In such a filter, the metal film is immersed or embedded between dielectric films in such a fashion as to cause the metal film to transmit energy at a particular wavelength and to induce it to transmit an unusual amount of energy at the design wave-length. Such a filter consists of a substantially transparent substrate 41 formed of a suitable material such as glass and which is provided with a surface 42. A multilayer coating 43 is provided on the surface 42 and includes a plurality of dielectric layers and a single metal layer which is embedded within the dielectric layers. Thus, there are provided 5 dielectric layers 44, 45, 46, 47 and 48 and a single metal layer 49. Again, it is desirable that the dielectric layers be formed of non-absorbing materials such as titanium dioxide and silicon dioxide as described in connection with the embodiment shown in FIG. 6. The layers have a sequence of A B A C B A in which A represents the titanium dioxide, B represents silicon dioxide and C represents Inconel.

Figure 12:
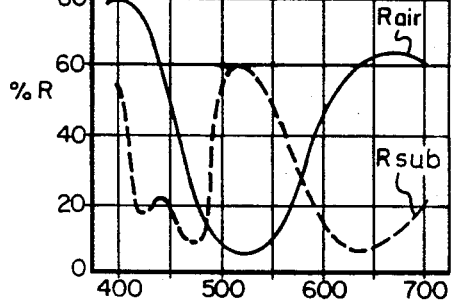
FIGS. 12 and 13 are graphs showing the reflectance and transmittance of a specific filter constructed in accordance with FIG. 11.
Figure 13:
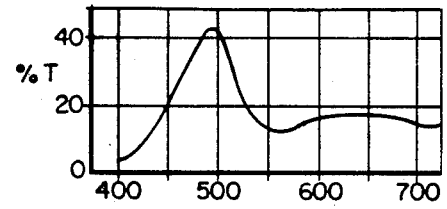

A filter constructed in accordance with FIG. 11 and giving the results shown in the graph shwon in FIGS. 12 and 13 was formed of quarter wave stack of titanium dioxide, silicon dioxide and Inconel and was designed for design wavelength of 3,100 nanometers. Such a filter from the air side had a reflection which was at a minimum in the green or in the middle of the visible spectrum and which was high on both ends showing a magenta or purplish appearance. Thus, both the blue and red reflectances are rather high exceeding 60 percent to give the filter a metallic appearance. From the substrate side, the filter had a reflection peak in the green and, therefore, had a green appearance. From the transmission curve as shown in FIG. 13, it can be seen that the transmission reaches a peak of approximately 43 percent in the green region. However, this peak is rather narrow and the transmission average is approximately 15 percent in the blue and red regions. Although the ratio of the maximum to the minimum is quite large, the filter does not appear to be strongly colored owing to the narrowness of the transmission peak. Such a filter could still be classified as a neutral interference filter.

A filter made in accordance with the construction shown in FIG. 11 is a desirable filter because it has a very good reflective color.

The multilayer coatings which have heretofore been described can be briefly characterized as coatings which are comprised of only one metal layer and which have high color on both sides. The multilayer coatings which are hereinafter described can be characterized as having a strong color on one side with a low reflection, i.e., less than 4 percent on the opposite side and with a low transmission. It has been found that to achieve the low reflection on one side of the filter it is necessary to utilize designs which have two or more metal layers. This low reflection on one side with a strong color on the opposite side is useful in many applications as, for example, sunglasses.

Figure 14:
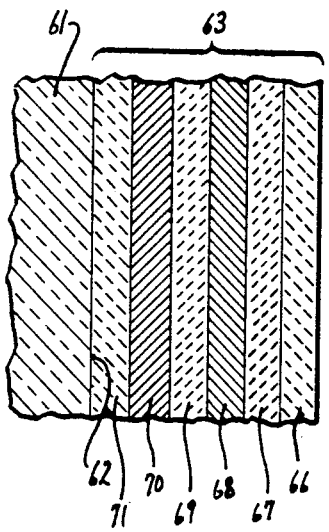
FIG. 14 is a cross-sectional view of another embodiment of a filter incorporating the present invention.

Filter constructions which have these features are shown in FIGS. 14, 16, 19, 21 and 23. In the embodiment of the filter shown in FIG. 14, it can be seen that the filter consists of a substrate 61 which is substantially transparent. It can be formed of any suitable material such as glass. The substrate 61 is provided with a surface 62 which carries a multilayer coating 63. The multilayer coating is comprised of two or more layers of absorbing material such as a metal, each of which is paired with one or more dielectric layers. Thus, as shown in FIG. 14, there is provided a multilayer coating having six layers 66–71 which have been numbered 1–6, starting with the layer adjacent to the medium. Two of these layers 3 and 5 are formed of a suitable metal such a nickel, although other metals such as Inconel, chromium, tantalum, nickrome, rhodium and other optical metals can be used. Each of the metal layers 3 and 5 is paired with a dielectric layer. Thus, the metal layer 3 is paired with dielectric layer 2 and the metal layer 5 is paired with the dielectric layer 4. The dielectric layers 2 and 4 can be formed of any suitable material which has the desired characteristics. One material found to be suitable is disclosed in U.S. Pat. No. 3,034,924. Other high index materials such as titanium dioxide, zinc sulphide and cerium dioxide can be used. The layers 66 and 71 are matching layers. The layer 61 matches the metal dielectric pairs to the medium in which the filter is disposed. For example, if the medium is air, one material found to be suitable for the matching layer is magnesium fluoride. The matching layer 71 is provided for matching the metal dielectric pairs to the substrate 61. With an index of refraction of approximately 1.5 for the substrate, a matching layer formed of magnesium fluoride was found to be particularly suitable.

By way of example, one filter constructed in accordance with the design shown in FIG. 14 had the following characteristics:

| Layer | Index of medium complex index | | Phys thick in millimicrons | Q-W opt TH in millimicrons |
|---|---|---|---|---|
| | n | k | 1.0000 | |
| 1 | 1.3800 | 0.0000 | 56.9 | 314.3 |
| 2 | 2.0800 | 0.0000 | 40.5 | 336.6 |
| 3 Table 1 | | | 11.5 | |
| 4 | 2.0800 | 0.0000 | 58.7 | 488.1 |
| 5 Table 1 | | | 11.5 | |
| 6 | 1.3800 | 0.0000 | 153.1 | 844.8 |

Index of substrate 1.5170 where n = the index of refraction of the material
k = the absorption coefficient of the material The complex index for the metal nickel which was utilized in the filter for layers 3 and 5 is shown in Table 1 below:

TABLE 1

| Wavelength | Complex Index | |
|---|---|---|
| | n | k |
| 400.0000 | 2.17 | 1.75 |
| 500.0000 | 2.34 | 2.17 |
| 600.0000 | 2.57 | 2.51 |
| 700.0000 | 3.16 | 2.58 |

The Table 1 has been provided for the metal because as is well known to those skilled in the art the index of refraction and the absorption coefficient changes with wavelength.

The quarter wave optical thickness for the various dielectric layers and the physical thickness of the metal layers can vary between ± 5 percent without unduly affecting the results which can be obtained. The materials for use in the matching layers having a low reflectivity other than magnesium fluoride can be materials such as fused silica or "Vycor."

Figure 15:
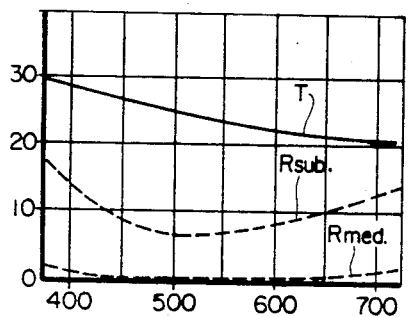
FIG. 15 is a graph showing the reflectance and transmittance of a specific filter constructed in accordance with FIG. 14.

A graph showing the results which can be obtained in constructing a filter in accordance with the design shown in FIG. 14 is shown in FIG. 15. As can be seen from the graph, curves are provided showing the transmittance of the filter, the reflection from the substrate and the reflection from the medium. From examining these curves, it can be seen that such an optical filter has the following attributes:

1—low reflectance—(less than 4 percent on the medium side of the filter over a broad spectral region) covering at least the visible portion of the electromagnetic spectrum;

2—neutral transmission (over the same spectral region as (1) with transmission levels ranging from 0 to 60 percent;

3—moderate (10 percent) to high (80–99 percent) although not necessarily uniform reflectance from the opposite side of the filter (over the same spectral region as (1)).

The low reflectance of 4 percent has been chosen as the criteria because this is the reflectance of uncoated glass and thus anything that has a reflectance less than 4 percent is considered to be a low reflector. In examining FIG. 15, it can be seen that the reflectance on the medium side is substantially less than 4 percent and, in fact, is approximately 0 through a substantial range of the spectrum covered by the filter. The reflectance from the substrate side is also quite low and it does have some color. As can be seen from the curve for the reflectance from the substrate side, the reflection is a maximum in the blue and the red and a low reflection in the green which means that the filter to the eye will look either purple or lavender with not a very intense color because of the low reflectivity on this side. The transmission will appear neutral.

A filter of the type having the characteristics shown in FIG. 15 is particularly suitable for use as sunglasses because the transmission is close to that desired, namely, 28 to 25 percent for sunglasses.

Figure 16:
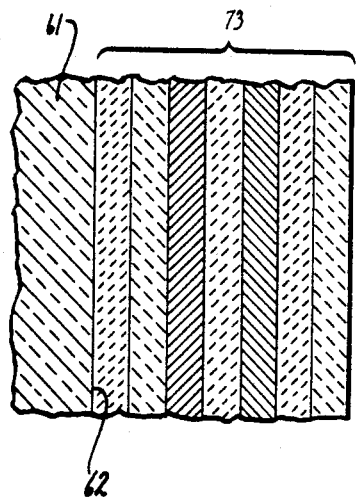
FIG. 16 is a cross-sectional view of another embodiment of a filter incorporating the present invention.

Another embodiment of the filter is shown in FIG. 16 which is very similar to the filter shown in FIG. 14 with the exception that it has been provided with an additional layer 7 to increase the intensity of the color. As can be seen from FIG. 16, this additional layer 7 which is layer No. 7 counting from the medium is disposed between the layer 6 counting from the medium and the substrate to provide a multilayer coating 73. Thus, as in the previous embodiment, there has been provided two metal absorbing layers each of which has associated therewith a dielectric layer. The pair of metal dielectric layers is designed so that the reflectance from the pair does not approach an appreciable fraction of the reflectance of the opaque material being utilized for the metal layers. Thus, it can be seen that the metal which is utilized in the filter is divided into at least two layers so that it is possible to achieve the desired reflectance over a broad spectral region.

By way of example, a filter constructed in accordance with FIG. 16 had the same physical thicknesses and quarter wave optical thicknesses as shown for FIG. 14. The only addition is the seventh layer which was formed of the same material as layers 2 and 4 and which had a physical thickness of 106.0 millimicrons and a quarter wave optical thickness of 881.9 millimicrons. It has been found that the thickness of this additional or seventh layer can vary within ± 5 percent.

Figure 17:
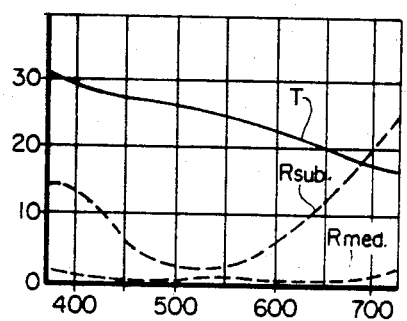
FIG. 17 is a graph showing the reflectance and transmittance of a specific filter constructed in accordance with FIG. 16.

A graph showing the characteristics of the filter in FIG. 16 is shown in FIG. 17. Again, as can be seen, the graph shows the transmission, the reflection from the substrate side and the reflection from the medium side. The reflection from the medium side is again substantially below 4 percent.

The transmission is well below 60 percent. In comparing the reflectance from the substrate side with the reflectance shown in FIG. 15 it can be seen that the reflection in the red and blue regions is almost the same but that the reflection in the green is practically eliminated in FIG. 17. For this reason, the intensity of the color to the eye will be more saturated or intense in color, in the form of a purple or lavender.

Different colors can be obtained with the filters including two or more metal layers in their designs by changing the metal dielectric pairs. By way of example, a filter constructed in accordance with FIG. 16 has the following characteristics:

| | Index of medium complex index | 1.0000 | | |
|---|---|---|---|---|
| Layer | n | k | Phys thick in millimicrons | Q-W opt TH in millimicrons |
| 1 | 1.3800 | 0.0000 | 58.0 | 320.2 |
| 2 | 2.0800 | 0.0000 | 44.1 | 366.9 |
| 3 Table 1 | | | 11.5 | |
| 4 | 2.0800 | 0.0000 | 163.6 | 1361.2 |
| 5 Table 1 | | | 11.5 | |
| 6 | 1.3800 | 0.0000 | 153.1 | 844.8 |
| 7 | 2.0800 | 0.0000 | 106.0 | 881.9 |

Index of substrate 1.5170 where n = the index of refraction of the material
k = the absorption coefficient of the material The materials utilized were the same as utilized in the embodiment shown in FIG. 16 with the only difference being in the thickness of the various layers as can be seen by comparing the characteristics of the filters.

Figure 18:
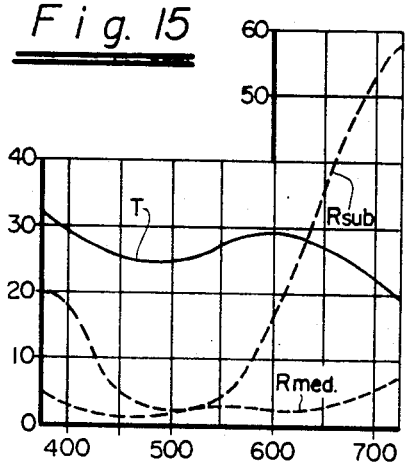
FIG. 18 is a graph showing the reflectance and transmittance of another specific filter constructed in accordance with FIG. 16.

A graph showing the results which can be obtained when the filter is constructed in this manner is shown in FIG. 18. As in the previous graphs, the transmittance, the reflectance from the substrate side and the reflectance from the medium side are shown. Again, it can be seen that the reflectance from the medium side remains below 4 per cent. The reflection in the green is generally the same as shown in FIG. 17 but the reflection in the red and the blue has been raised substantially to make the color more intense than in the designs which are shown by the curves in FIGS. 15 and 17. Thus it can be seen by making certain changes, the hue of the color may be made more intense.

In the filter which is represented by the curves shown in FIG. 18, this increase in the hue of the color has been obtained by increasing the thickness of layer 4 by a half wave in the green region. By increasing a layer in thickness by half wave, this does not change the reflectance or transmittance characteristics at the point of the half wave and therefore the reflectance in the green region does not change. The addition of this half wave in the green region however increases the dispersion on both sides of the half wave to cause a larger change in the reflection on both sides of the half wave.

Figure 19:
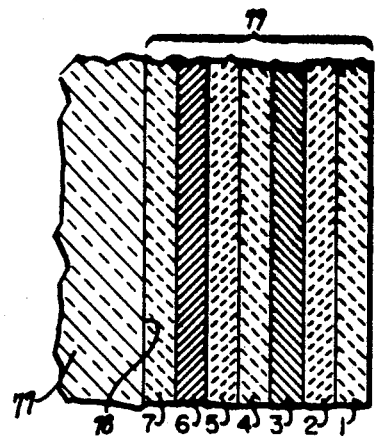
FIG. 19 is a cross-sectional view of another embodiment of a filter incorporating the present invention.

Still another embodiment of the filter is shown in FIG. 19 in which the substrate 77 is provided with a surface 78 having a multilayer coating 79 thereon. The multilayer coating has seven layers numbered 1–7 counting from the medium to the substrate. In this design, the metal layers are layers 3 and 6 and are formed of nickel. The dielectric layers associated with the metal layers 2 and 5 are formed of the material described in U.S. Pat. No. 3,034,924. Layers 1 and 7 are matching layers of magnesium fluoride and an additional layer 4 of the same material, magnesium fluoride, has been provided.

The design as shown in FIG. 19 is included to show that it is not necessary that the metal dielectric pairs be adjacent to each other but that other layers can be disposed between the metal dielectric pairs. Additional layers can be added around the metal dielectric pairs to change the appearance or to change the color of the filter. Thus with the design shown in FIG. 19, the purpose was to obtain a filter which had a blue color in reflectance when looking from the substrate side. The characteristics for a filter constructed in this manner are set forth below:

| | Index of medium | 1.0000 | | |
|---|---|---|---|---|
| | complex index | | | |
| Layer | n | k | phys thick in millimicrons | Q-W opt TH in millimicrons |
| 1 | 1.3800 | 0.0000 | 80.8 | 445.9 |
| 2 | 2.0800 | 0.0000 | 40.7 | 338.8 |
| 3 Table 1 | | | 11.5 | |
| 4 | 1.3800 | 0.0000 | 72.9 | 402.4 |
| 5 | 2.0800 | 0.0000 | 45.0 | 374.4 |
| 6 Table 1 | | | 11.5 | |
| 7 | 1.3800 | 0.0000 | 90.0 | 496.8 |

Figure 20:
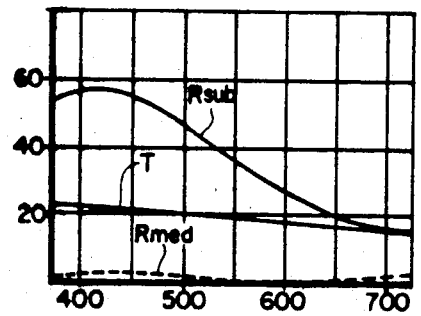
FIG. 20 is a graph showing the reflectance and transmittance of a specific filter constructed in accordance with FIG. 19.

Index of substrate 1.5170 where n = the index of refraction of the material
k = the absorption coefficient of the material A graph showing the characteristics which were obtained with such a filter is shown in FIG. 20. Again, the transmittance is well below 60 percent and the reflectance from the medium side is well below 4 percent throughout the spectrum of interest. The reflectance from the substrate side shows that there is a very strong reflectance or peaking in the blue region at approximately 450 millimicrons which falls off gradually into the red to give a blue appearance to the eye. The reflection from the medium side is less than 1 percent. The transmission is relatively flat falling from approximately 22 percent of the blue to 15 percent in the red which will appear neutral, i.e., without color, to the eye in looking through the filter.

Figure 21:
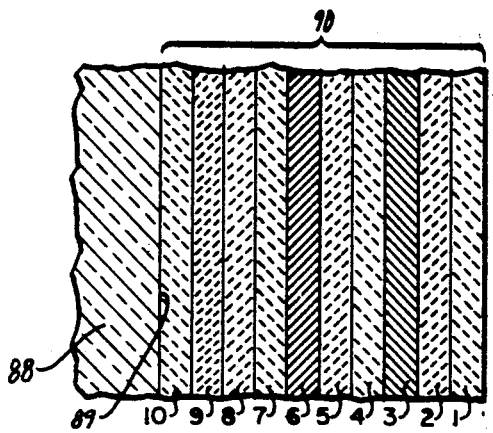
FIG. 21 is a cross-sectional view of still another embodiment of a filter incorporating the present invention.

In FIG. 21 there is shown a design in which additional dielectric layers have been provided around the metal dielectric pairs. Thus, the substrate 88 which has a surface 89 has a multilayer coating 90 deposited thereon consisting of ten layers which are identified as layers 1–10. Layers 3 and 6 are again the metal layers formed of nickel, the dielectric layers associated with the metal layers are layers 2 and 5, respectively. Additional dielectric layers 8 and 9 have been provided to increase substrate reflectance and to add more color. The same materials as in the previous embodiments have been utilized.

By way of example, a filter constructed in accordance with the design shown in FIG. 21 had the following characteristics:

| | Index of medium complex index | 1.000 | | |
|---|---|---|---|---|
| Layer | n | k | phys thick in millimicrons | Q-W opt TH in millimicrons |
| 1 | 1.3800 | 0.0000 | 80.8 | 445.9 |
| 2 | 2.0800 | 0.0000 | 40.7 | 338.8 |
| Table 1 | | | 11.5 | |
| 4 | 1.3800 | 0.0000 | 72.9 | 402.4 |
| 5 | 2.0800 | 0.0000 | 45.0 | 374.4 |
| 6 Table 1 | | | 11.5 | |
| 7 | 1.3800 | 0.0000 | 90.0 | 496.8 |
| 8 | 2.0800 | 0.0000 | 59.7 | 496.7 |
| 9 | 1.3800 | 0.0000 | 90.0 | 496.8 |
| 10 | 2.0800 | 0.0000 | 59.7 | 496.7 |

Figure 22:
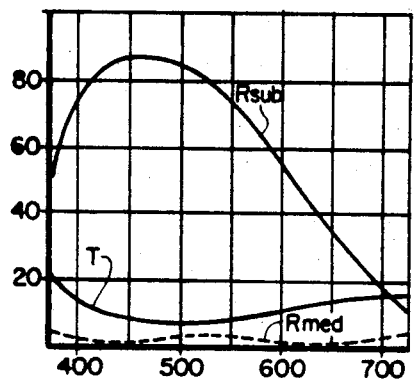
FIG. 22 is a graph showing the reflectance and transmittance of a specific filter constructed in accordance with FIG. 21.

Index of substrate 1.5170 where n = the index of refraction of the material
k = the absorption coefficient of the material A graph showing the results from such a filter is shown in FIG. 22. As can be seen, the reflectance from the substrate side goes up to approximately 80 percent in the blue region while at the same time the reflection from the medium side is below 4 percent all the way across the visual spectrum. Although the transmission is not quite neutral, the filter will still have a substantially neutral appearance to the eye. The filter from the substrate side will have an intense mirror like color in the blue.

Figure 23:
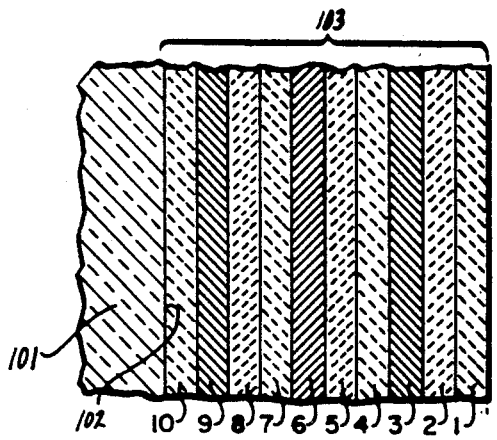
FIG. 23 is a cross-sectional view of another embodiment of a filter incorporating the present invention.

Still another design of the filter is shown in FIG. 23 to show that more than two metal dielectric pairs can be utilized. The substrate 101 having a surface 102 has a multi-layer coating 103 deposited thereon which is comprised of ten layers numbered 1–10 from the medium to the substrate. Layers 3, 6 and 9 are formed of metal. The associated dielectric layers are 2, 5 and 8.

The first metal-dielectric combination is layers 2 and 3. Two metal-dielectric combinations are then used which are made up of a dielectric, a metal and a dielectric represented by layers 5, 6 and 7 and by layers 8, 9 and 10. Layer 4 separates the first and second metal-dielectric combinations. Layer 1 is a matching layer. The last metal-dielectric combination matches the substrate by itself.

The characteristics of a filter constructed in accordance with FIG. 23 is set forth below:

Index of medium complex index 1.0000

| Layer | n | k | Phys thick in millimicrons | Q-W opt TH in millimicrons |
|---|---|---|---|---|
| 1 | 1.3800 | 0.0000 | 96.9 | 535.1 |
| 2 | 2.0800 | 0.0000 | 48.9 | 406.5 |
| 3 Table 1 | | | 11.5 | |
| 4 | 1.3800 | 0.0000 | 87.5 | 482.8 |
| 5 | 2.0800 | 0.0000 | 54.0 | 449.3 |
| 6 Table 1 | | | 11.5 | |
| 7 | 1.3800 | 0.0000 | 108.0 | 596.2 |
| 8 | 2.0800 | 0.0000 | 54.0 | 449.3 |
| 9 Table 1 | | | 11.5 | |
| 10 | 1.3800 | 0.0000 | 108.0 | 596.2 |

Figure 24:
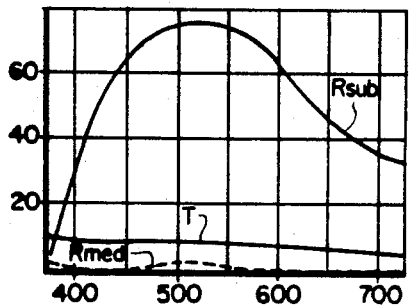
FIG. 24 is a graph showing the reflectance and transmittance of a specific filter constructed in accordance with FIG. 23.

Index of substrate 1.5170 where $n$ = the index of refraction of the material
$k$ = the absorption coefficient of the material A graph showing the results obtained from such a filter is shown in FIG. 24. The reflection from the medium side is approximately 1 percent. The transmission is quite flat averaging approximately 8 percent so that the transmission would be neutral. The reflection from the substrate side will be quite colored and in the green region almost a lime green. As can be seen, the reflection from the substrate side is approximately 78 percent in the green.

In the embodiments of the filter shown in FIGS. 14 through 24, it can be seen that the thickness of each of the metal layers is approximately half of the thickness of the metal layers described in the embodiments in FIGS. 1 through 13. Thus it can be seen that the total metal thickness in all of the filters disclosed in the present invention are approximately the same but in the filters disclosed in conjunction with FIGS. 14 through 24, the thickness of the metal is divided into two or more layers rather than in one layer. This ensures that the reflectance of the metal in a dielectric-metal combination does not become too great so that it cannot be overcome in the design by a matching layer at the end of the stack.

The filters hereinbefore described have many uses. For example, as pointed out previously, they can be utilized in the sunglasses in which the outward appearance of the sunglasses gives a distinct color which to the wearer appears to be neutral because of the neutral transmission characteristics. Thus it is possible to manufacture sunglasses having different colors but which still would be relatively neutral in transmission. In addition, they would have low reflectance from the side facing the user which is also advantageous in sunglasses. The filters would also be useful in many architectural applications. For example, such filters could be used in buildings in which there is greater illumination intensity on one side than on the other as from the sun. In addition, such filters can be utilized for purely decorative purposes in which the colors obtained can be utilized for matching the decor of the surrounding but which would still retain their neutral transparency which is required for good visual observation.

From the foregoing it can be seen that there has been provided a filter which has many outstanding features. In addition to being neutral in transmission and giving colored reflection, such filters have coatings which are quite durable and can be utilized in many applications. Certain of the filters have a very low reflectance on one side over a broad spectral region and have a moderate to high reflectance on the other side. They also have a transmission which is substantially less than 60 percent.

We claim:

1. In a multi-chromatic filter, a substantially transparent substrate having a surface and a multilayer coating carried on said surface, said multilayer coating having at least one absorbing layer formed of a metal and a dielectric layer, said multilayer coating having a transmission below 60 percent and being substantially neutral in transmission, one side of the coating having a reflectance which changes as a function of wavelength in the visible spectrum to give a colored appearance to the filter from said one side and the other side of the coating having a reflectance which is below approximately 4 percent over a broad spectral region.

2. A filter as in claim 1 wherein the reflectance from said one surface of the coating is above 10 percent.

3. A filter as in claim 1 in which at least two metal layers are provided and in which a dielectric layer is associated with each of the metal layers.

4. A filter as in claim 3 wherein said multilayer coating includes matching layers on opposite sides of the same.

5. A filter as in claim 1 wherein said metal layer is formed of Inconel and the dielectric layer is formed of titanium dioxide.

6. A filter as in claim 3 wherein said metal layers are formed of nickel and wherein said dielectric layers are formed of a high index material.

7. A filter as in claim 4 wherein said matching layers are formed of magnesium fluoride.

8. A filter as in claim 1 wherein there are provided a plurality of dielectric layers and wherein said dielectric layers are formed of two different non-absorbing materials.

9. A filter as in claim 8 wherein said two different non-absorbing materials are titanium dioxide and silicon dioxide.

10. A filter as in claim 1 wherein at least three metal layers are provided and each of the metal layers has associated therewith at least one dielectric layer to form metal dielectric pairs.

11. A filter as in claim 1 wherein there are provided at least three metal layers and wherein said metal layers have at least one dielectric layer associated therewith, certain of said metal layers having at least two dielectric layers associated therewith to form a metal dielectric combination.

12. In a multi-chromatic filter, a substantially transparent substrate having a surface and a multilayer coating deposited on said surface, said multilayer coating having at least first and second metal layers, each of said metal layers having a dielectric layer paired therewith so that the reflectance from the pair does not approach an appreciable fraction of the reflectance of the material being utilized for the metal layer, said filter being substantially neutral in transmission and having a transmission substantially below 60 percent, said coating on the one side having a low reflectance which is below approximately 4 percent and on the other side having at least a moderate reflectance which changes as a function of wavelength to give an appearance of color in the visible region from the other side.

13. A filter as in claim 12 wherein said metal layers have a thickness less than 200 Angstroms each.

14. A filter as in claim 12 wherein said metal layers are formed of nickel and wherein said dielectric layers are formed of a high index material.

15. A filter as in claim 12 wherein certain of said metal layers are provided with an additional dielectric layer to provide a metal dielectric combination.

16. A filter as in claim 15 wherein two of said metal dielectric combinations are provided.

17. A filter as in claim 12 wherein said coating includes matching layers on opposite ends of the coating.

18. A filter as in claim 17 wherein said matching layers are formed of magnesium fluoride.

* * * * *